April 24, 1928.
E. G. RALSTON
1,667,492
GRAPHIC METER CHART AND DRIVE
Filed May 21, 1926
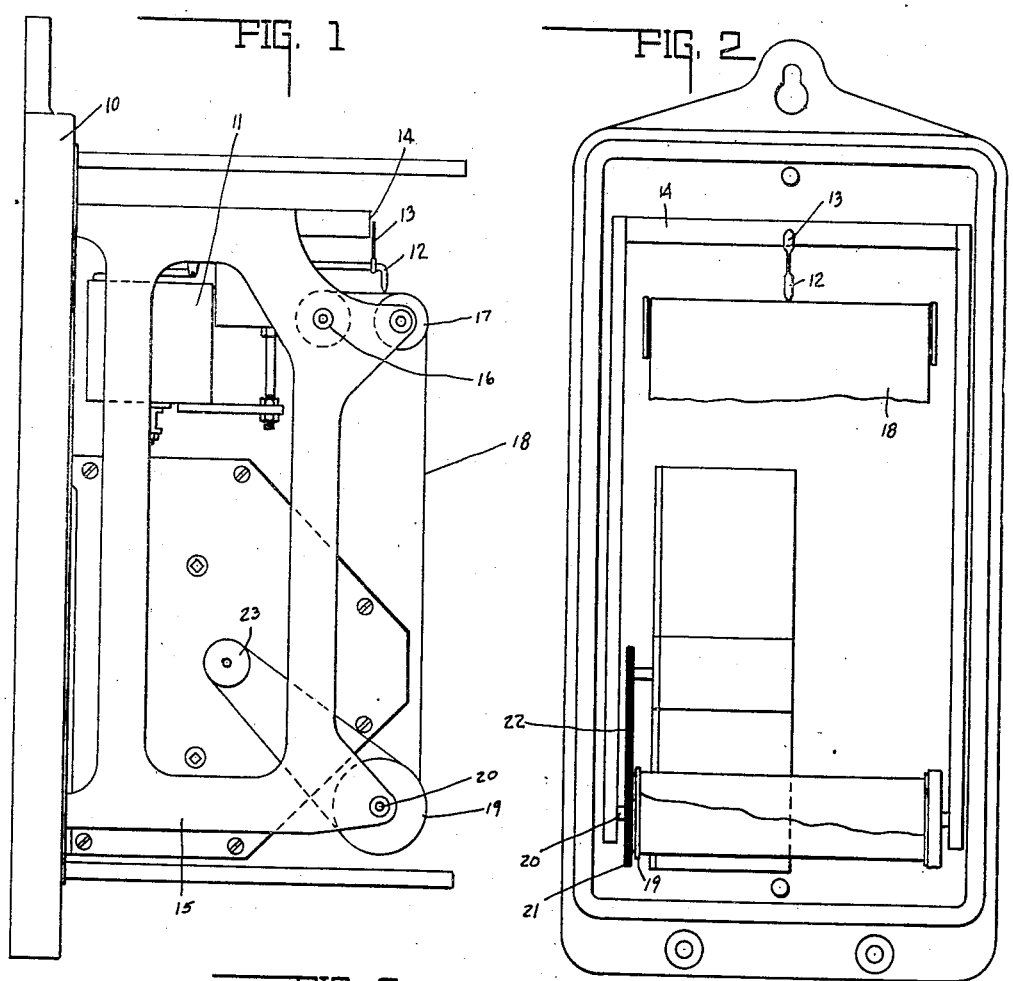
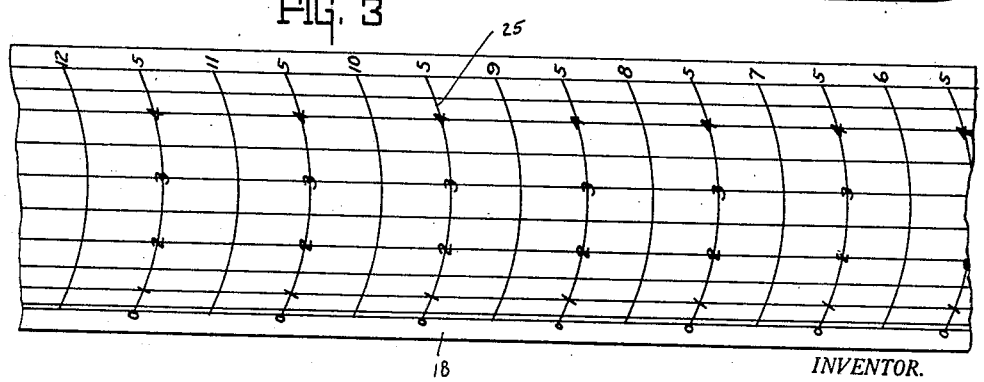
INVENTOR.
EMMET G. RALSTON.
BY
*[signature]*
ATTORNEYS.

Patented Apr. 24, 1928.

1,667,492

UNITED STATES PATENT OFFICE.

EMMET G. RALSTON, OF INDIANAPOLIS, INDIANA.

GRAPHIC-METER CHART AND DRIVE.

Application filed May 21, 1926. Serial No. 110,683.

This invention relates to a graphic meter.

The chief object of this invention is to obtain a record which will show in considerable detail fluctuations or variations of the metered demand by means which are relatively inexpensive.

The chief feature of the invention consists in the combination of a graphic meter recorder, a strip chart adapted to receive a record thereon, and a single motive means associated with the rewind roll for constant rotation, said strip chart including progressively increasing time unit divisions for compensating for the increased peripheral speed of the strip by reason of the increased diameter of the rewind roll in rewinding.

The full nature of the invention will be understood from the accompanying drawings and the following description and claim:

Fig. 1 is a side elevational view with cover removed of one form of graphic meter with the strip chart and single unit rewind drive associated together. Fig. 2 is a front view thereof with the strip chart broken away to show other parts of the mechanism in detail. Fig. 3 is a plan view of the strip chart and specifically illustrates the progressively increasing time unit divisions.

In the graphic meter art the circular chart is objectionable when it is desired to obtain a relatively detailed record of operation. The strip chart type of meter has the advantage of recording minor fluctuations in the metered demand. Graphic strip chart meters, however, are more expensive, generally, than circular chart meters, for in order to secure substantially correct chart movement synchronized to elapsed time, said strip charts are perforated and geared by said perforations to the driving mechanism generally associated with a driving roll and usually the feeding or supply roll, or the intermediate roll and the rewind roll necessarily is provided with suitable power means in the form of springs, or a second motive drive connection for rewinding the chart.

The present invention provides a graphic meter having a cost readily comparable to the circular chart meters but having all of the advantages of the strip chart meter and substantially none of its disadvantages. This is accomplished by the utilization of a non-perforated chart strip and causing the movement thereof by actuating the rewind roll only and compensating for variations in the rewind roll diameter, which otherwise would introduce errors by reason of increased peripheral speed of the strip chart by correspondingly progressively increasing the length of divisions of the successive scale upon a strip chart.

10 indicates a supporting base of a graphic meter which may be of any type, that is, for measuring any particular unit, for example, amperes, bolts, watts, degrees of temperature etc. The metering mechanism is indicated by the numeral 11 and has a recording pen 12, which also carries an indicator 13 for positioning adjacent a scale 14. Mounted in the frame work 15 is a supply roll 16 and an intermediate roll 17 over which passes a strip chart 18 carried by the supply roll and running towards the rewind roll 19. Shaft 20 supporting rewind roll 19 also carries a driving gear 21. Sprocket chain 22 meshing therewith is driven by sprocket pinion 23 of the clockwork mechanism. The rewind roll 19 is provided with a slot and the free end of the chart is positioned in said slot and the chart is moved by the rotation of the rewind roll shaft 20. As the strip passes beneath the pen 12, it receives the record and as said strip winds upon the rewind roll the diameter thereof increases and therefore the peripheral speed of the chart increases, although the angular speed of the roll remains the same. This increased peripheral speed, therefore, will give an erroneous reading with respect to time if compensation were not provided.

Fig. 3 shows the method of compensating for the aforesaid, and herein the strip chart 18 is shown non-perforated but is provided with time unit division lines 25 forming time unit divisions which progressively increase from one end to the other of the roll. Thus, as the peripheral speed of the strip increases by reason of the increased diameter of the rewind roll, the amount of paper or chart between each time division is correspondingly increased. Thus, substantially perfect time relationship is maintained between the recorder 12 and the chart 18 immediately therebeneath.

A true record, therefore, is thus obtained which has all the advantages of the strip chart method and which is as economical as the circular chart device.

The invention claimed is:

A combination for obtaining a permanent substantially instantaneous and continuous and accurate record comprising a supply roll, a rewind roll, means for continuously and uniformly rotating said rewind roll, a chart strip mounted upon the supply roll and wound upon the rewind roll with an intermediate plane portion, a recording device including a pivoted pen arcuately movable across the chart in a plane parallel to the same and having a portion engaging said chart at the intermediate plane portion thereof for recording variations to which the device is sensitive, said chart strip having a plurality of parallel arcuate time space divisions formed by linear demarkations thereon, said divisions being progressively and uniformly varied as to spacing to compensate for the uniform change in external diameter of the rewind roll and the chart as wound thereon, said time division demarkations having the same radius as the pen travel radius, whereby pen movement is parallel to the time division linear demarkations, whereby the record is substantially instantaneously, continuously and accurately recorded on said chart strip.

In witness whereof, I have hereunto affixed my signature.

EMMET G. RALSTON.